United States Patent [19]

Ishizuka

[11] 4,440,573
[45] Apr. 3, 1984

[54] METHOD FOR PRODUCING DIAMOND COMPACT

[76] Inventor: Hiroshi Ishizuka, 19-2, Ebara 6-chome, Shinagawa-ku, Tokyo, Japan

[21] Appl. No.: 371,130

[22] Filed: Apr. 23, 1982

[30] Foreign Application Priority Data

Apr. 24, 1981 [JP] Japan .................. 56-61271

[51] Int. Cl.³ .................. B22F 3/00; C22C 1/05
[52] U.S. Cl. .................. 75/243; 419/11; 419/27; 51/307; 51/309
[58] Field of Search .................. 51/307, 309; 419/27, 419/11; 75/243

[56] References Cited

U.S. PATENT DOCUMENTS 3,285,714  11/1966  Davies et al. .................. 419/27
3,301,643  1/1967   Cannon et al. .................. 419/27
3,850,591  11/1974  Wentorf .................. 51/309
4,303,442  12/1981  Hara et al. .................. 75/243

Primary Examiner—Brooks H. Hunt
Attorney, Agent, or Firm—Brady, O'Boyle & Gates

[57] ABSTRACT

A method for producing compact of diamond particles, comprising: providing a mass of diamond particles and a metallic material capable of dissolving carbon, as infiltrant, with a substantially identical cross section, placing said diamond and infiltrant metal close to but separated with each other with an intervening layer of high melting metal, as barrier, which has a cross section of 85 to 97% relative to that of the diamond and infiltrant metal, and subjecting the whole to an elevated pressure and temperature condition within the diamond stability region of carbon phase diagram, thus allowing a regulated amount of fused infiltrant metal to flow in among the mass of diamond to join adjacent particles with each other, and recovering a compact of thus joined diamond particles.

2 Claims, No Drawings

METHOD FOR PRODUCING DIAMOND COMPACT

The present invention relates to a method for producing a diamond compact which is adequately applicable as material of such wear and compression resistant parts as turning tool, wire drawing die and anvils for very high pressure generation.

Diamond compact is usually produced by joining diamond particles or grains either with a certain metallic material, such as cobalt, nickel and their based alloyes, as binder, or directly without any additional material between adjacent particles. Since the latter process requires such severe conditions as, for example, a temperature on the order of 2000° C. at a pressure in excess of 80 kb, simultaneously, the former is favorably practised on an industrial scale which, by using such infiltrant medium of fused metal, is operable at much milder pressure and temperature conditions. In particular, it is known in the art that rather coarse diamond particles can be effectively joined by means of an inflow of fused metal running among the particles. For example, U.S. Pat. No. 3,745,623 to Wentorf Jr. et al. describes a process of joining diamond particles by means of an inflow of liquid metal basically consisting of cobalt metal from WC-Co substrate placed in adjacence, on which the compact is to be supported. Even though the process allows to produce a compact which exhibits good mechanical properties by regulating temperature condition for treatment so as to provide a proper volume of liquid phase, the optimal temperature range available is very limited and, process reproducibility is low. When regulation is so made that rather an elevated temperature condition is set for securing such limited optimal range taking possible temperature irregularity into consideration, an excessive volume of liquid phase is supplied to the diamond mass, so that the resulting compact unfavorably tends to exhibit rather insufficient mechanical properties due mainly to too much metallic phase intervening among joined diamond particles. This problem is seen also in production of diamond sole compact, without WC-Co substrate, whereby a mass of diamond particles are arranged on a plate of cobalt from which an infiltrant of fused metal is supplied.

Thus, the objective of the present invention is to provide a method for such products effectively eliminated of the above said drawbacks accompanying with conventional technique for production of diamond sole or composite compact with the carbide substrate.

Such objective has been fulfilled according to the invention by regulating the contact area between the diamond and infiltrant medium with an intervening barrier of high melting metal so that a properly regulated volume of fused metallic phase, is supplied to the diamond, and that the resulting compact may exhibit adequate mechanical properties, in spite of elevated temperatures now available.

According to the invention there is provided a method for producing compact of diamond particles, comprising: providing a mass of diamond particles and a metallic material capable of dissolving carbon as infiltrant, with a substantially identical cross section, placing said diamond and infiltrant metal close to but separated with each other with an intervening layer of high melting metal, as barrier, which has a cross section of 85 to 97% relative to that of the diamond and infiltrant metal, subjecting the whole to an elevated pressure and temperature condition within the diamond stability region of carbon phase diagram, thus allowing a regulated amount of fused infiltrant metal to flow in among the mass of diamond to join adjacent particles with each other, and recovering a compact of thus joind diamond particles.

In the invention a barrier of high melting metallic material is essentially used as placed between a mass of diamond and a metal to infiltrate among the former to join. Such barrier may consist of a thin sheet or foil of tantalum, molybdenum, tungsten or other metallic material which exhibits such a high melting point as to remain unfused under thermal conditions for the treatment. The thickness of the sheet is so selected that the sheet may maintain solidity under such conditions and ranges, for example 10 to 100$\mu$m. Relative cross section of the barrier, which is essential to the invention, favorably ranges from 85 to 97% and more optimally from 90 to 95% relative to the facing area between the diamond and infiltrant material. A relative area smaller than 85% tends to allow too much influx of fused metal, resulting in a too great spacing between adjacent diamond particles to achieve adequate properties, while such area over a 97% limit provides too low a rate of liquid supply, unfavorably leaving unjoined particles after a given period of time for the process, or alternatively requiring too long a time for completing the treatment.

In production of diamond sole compact a cylindrical vessel or container of tantalum, for example, is charged with a given amount of powdered diamond, a sheet of metal as barrier (of, for example, a 50 $\mu$m thick tantalum foil) and an infiltrant medium of such metal as cobalt, nickel and/or their alloy as a block or powder, and closed with a lid. The whole is then mounted on a high temperature high pressure apparatus to subject to a sintering process under a combined pressure-temperature condition over 1200° C. in the diamond stability region of carbon phase diagram as determined by Berman and Sir F. Simon in Zeitschrift für Elektrochemie, Vol. 59, No. 5 (1955) pp. 333~338, and by C. Scott Kennedy and George C. Kennedy in Journal of Geophysical Research, Vol. 81, No. 14 (1976) pp. 2467~69. Reaction mass, as recovered, is removed of vessel material and, for finishing, further shaved by grinding remnant from infiltrant and barrier metals.

In production of a flat composite compact of diamond with tungsten carbide, similarly to the above a vessel of high melting metal such as tantalum is filled with a layer of a given mass of diamond, a barrier sheet metal, an infiltrant metal, and then WC-Co material as either a fired or pressed form or as a loose mixed powder. The vessel then is closed and as a whole subjected to the diamond stability region as described above. Reaction mass as recovered is removed of attachment of vessel material and then finish machined to a plane on the carbide face, and also diamond face as necessary.

Example 1

A cylindrical vessel of tantalum of 9.2 mm I.D. was charged with a 0.1 gram of powdered diamond of 5 to 12 $\mu$m, a 0.05 mm thick tantalum disc 8.9 mm across as barrier, a 0.1 mm thick cobalt disc 9.1 mm across as infiltrant medium, and a fired cylinder of WC-Co alloy of a 9.1 mm diameter and a 1.7 mm thickness in this sequence. The vessel was closed at each end with a tantalum plate and subjected to a combined condition of 60 kb pressure and 1400° C. temperature for five minutes for sintering the diamond mass. Resulting composite exhibited a Knoop hardness of 6500 to 7000 Kg/mm² on the surface.

Example 2

The process of Example 1 was repeated using a similar cylindrical vessel of tantalum but without a tungsten carbide substrate. The vessel of a 9.0 mm I.D., was charged with 0.1 gram of 120/140 mesh/in. diamond powder, a 0.2 mm thick Invar (Trade name) disc as infiltrant medium as separated with a 0.06 mm thick molybdenum disc 8.5 mm across. With a closure of tantalum disc thereon, the whole was treated at 55 kb and 1350° C. for five minutes. The mass as recovered exhibited a structure in which the diamond particles were all joined with each other, and the resulting compact as finished exhibited a Knoop hardness of 7000 to 7500 Kg/mm².

As described above in detail, the invention whereby a barrier material of high melting metal is effectively arranged for regulating the inflow of infiltrant medium among grains of hard material to be sintered, permits production of diamond compact of a sufficient hardness in a substantially expanded range of temperature condition, thus achieving a substantial improvement in both workability and reproducibility of the process.

What I claim is:

1. A method for producing a compact of diamond particles comprising providing a mass of diamond particles and a mass of infiltrant metallic material, each mass having a substantially identical surface area; positioning said mass of diamond particles and said mass of infiltrant metallic material such that said surfaces of substantially identical surface area are separated by a barrier layer of high melting metal having a surface area of 85% to 97% of the surface areas of said mass of diamond particles and said mass of infiltrant metallic material; subjecting said positioned masses and barrier layer to an elevated temperature-pressure condition within the diamond stability region of the carbon phase diagram but below the melting point of said metallic barrier layer, thereby allowing a regulated amount of molten infiltrant metal to flow around said barrier layer and throughout the mass of diamond particles to bond the said diamond particles to each other and recovering a compact of bonded diamond particles.

2. The method of claim 1 wherein said barrier layer comprises tantalum, molybdenum or alloys thereof.

* * * * *